(12) United States Patent
Hakala (10) Patent No.: US 11,036,036 B2
(45) Date of Patent: Jun. 15, 2021

(54) OPTICAL DEVICE FOR MODIFYING LIGHT DISTRIBUTION

(71) Applicant: Ledil Oy, Salo (FI)

(72) Inventor: Olli Hakala, Turku (FI)

(73) Assignee: LEDIL OY, Salo (FI)

( * ) Notice: Subject to any disclaimer, the term of this patent is extended or adjusted under 35 U.S.C. 154(b) by 419 days.

(21) Appl. No.: 15/769,751

(22) PCT Filed: Oct. 20, 2016

(86) PCT No.: PCT/FI2016/050738
§ 371 (c)(1),
(2) Date: Apr. 20, 2018

(87) PCT Pub. No.: WO2017/072406
PCT Pub. Date: May 4, 2017

(65) Prior Publication Data
US 2020/0248888 A1 Aug. 6, 2020

(30) Foreign Application Priority Data

Oct. 26, 2015 (FI) ...................................... 20155759

(51) Int. Cl.
*F21V 7/00* (2006.01)
*G02B 17/08* (2006.01)
(Continued)

(52) U.S. Cl.
CPC ........ *G02B 17/086* (2013.01); *B29D 11/0074* (2013.01); *F21V 5/00* (2013.01); *F21V 5/046* (2013.01); *F21V 7/0091* (2013.01)

(58) Field of Classification Search
CPC .......... F21V 5/046; F21V 7/0091; F21V 5/00; F21V 3/049; F21V 3/02; B29D 11/0074;
(Continued)

(56) References Cited

U.S. PATENT DOCUMENTS 1,263,065 A 4/1918 Johanson
3,398,274 A * 8/1968 Rex ........................... F21V 5/00
362/348
(Continued)

FOREIGN PATENT DOCUMENTS

CN 101082681 12/2007
EP 2503231 9/2012
(Continued)

*Primary Examiner* — Rajarshi Chakraborty
*Assistant Examiner* — Fatima N Farokhrooz
(74) *Attorney, Agent, or Firm* — Nixon & Vanderhye (57) ABSTRACT

An optical device for modifying light distribution including a light-ingress surface and a light-egress surface. The light-ingress surface having convex areas and the light-egress surface comprises elevations so that the convex areas are configured to direct light to the elevations. Each elevation is configured to turn at least a part of light directed to the elevation sideward with respect to the height direction of the elevation. The convex areas of the light-ingress surface make it possible to direct the light to the elevations in a controlled way and thus the optical properties of the optical device can be designed more freely than for example in cases where the light-ingress surface is smooth or has depressions corresponding to the elevations so that the material thickness between the light-ingress and light-egress surfaces is constant.

19 Claims, 5 Drawing Sheets

(51) Int. Cl.
  *F21V 5/00* (2018.01)
  *B29D 11/00* (2006.01)
  *F21V 5/04* (2006.01)
(58) Field of Classification Search
  CPC ........ G02B 17/086; G21K 5/00; H01L 33/58;
        H01L 33/60; H01L 33/507; F21K 9/64;
                                F21Y 2115/10
  See application file for complete search history.

(56) References Cited

U.S. PATENT DOCUMENTS

| | | | |
|---|---|---|---|
| 4,722,023 A | | 1/1988 | Arima |
| 5,467,259 A | | 11/1995 | Hume |
| 2004/0004836 A1 | * | 1/2004 | Dubuc ...................... F21K 9/60 |
| | | | 362/249.01 |
| 2008/0068716 A1 | * | 3/2008 | Goto .................... G02B 5/0278 |
| | | | 359/599 |
| 2010/0290234 A1 | * | 11/2010 | Bierhuizen ........... F21V 7/0091 |
| | | | 362/311.02 |
| 2011/0085350 A1 | | 4/2011 | Chang |
| 2011/0182069 A1 | | 7/2011 | Dubuc |
| 2011/0210368 A1 | | 9/2011 | Jeong |
| 2012/0092852 A1 | | 4/2012 | Doan |
| 2016/0116723 A1 | * | 4/2016 | Hukkanen ........... G02B 6/0016 |
| | | | 362/329 |

FOREIGN PATENT DOCUMENTS

| | | | | | |
|---|---|---|---|---|---|
| EP | | 2677231 | | 12/2013 | |
| GB | | 620639 | | 3/1949 | |
| WO | | 2012005135 | | 1/2012 | |
| WO | | 2014104783 | | 7/2014 | |
| WO | | 2014184422 | | 11/2014 | |
| WO | | WO-2014184422 A1 | * | 11/2014 | ......... G02B 19/0061 |
| WO | | 2015103522 | | 7/2015 | |

* cited by examiner

OPTICAL DEVICE FOR MODIFYING LIGHT DISTRIBUTION

FIELD OF THE DISCLOSURE

The disclosure relates generally to illuminating engineering. More particularly, the disclosure relates to an optical device for modifying distribution of light produced by a light source that can be, for example but not necessarily, a light emitting diode "LED".

BACKGROUND

Distribution of light produced by a light source can be important or even critical in some applications. The light source can be, for example but not necessarily, a light emitting diode "LED", a filament lamp, or a gas-discharge lamp. In many cases there is a need to smoothen the distribution of light emitted by a light source for example so that the brightness is substantially the same or varies within allowed limits concerning different viewing directions. A traditional example of a device for smoothing a light distribution pattern is an ordinary lamp screen. In many cases, the operation of an ordinary lamp screen is at least partly based on material located on a light propagation path and absorbing a part of the light. This approach, however, leads to a situation where a part of the light is lost and converted into heat in the material absorbing the part of the light. Another approach for smoothing a light distribution pattern is based on transparent and/or reflective pieces which refract and/or reflect light. The reflections can be mirror-type reflections or total internal reflections "TIR" in transparent material. A traditional example of a device based on transparent and reflective pieces is a cut-glass chandelier.

In many cases there is, however, a need for optical devices which provide more controlled and deterministic optical properties for smoothing a light distribution pattern than traditional lamp screens and cut-glass chandeliers do. An inconvenience related to many optical devices based on lenses, prisms, and/or other optical elements is that there is a need for mechanical support structures that are capable of mechanically supporting the optical elements so that the positions of the optical elements with respect to each other are accurate enough. Typically, the optical properties deviate from the desired ones if the positions of the optical elements with respect to each other deviate from their desired positions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new optical device for modifying light distribution. An optical device according to the invention comprises:
  a first surface for acting as a light-ingress surface for receiving light, and
  a second surface for acting as a light-egress surface.

The first surface comprises a plurality of convex areas and the second surface comprises a plurality of elevations so that the convex areas are configured to direct light to at least some of the elevations. Each of the at least some of the elevations is configured to turn at least a part of the light directed to the elevation under consideration substantially sideward with respect to the height direction of the elevation under consideration. Each of the at least some of the elevations is tapering towards a tip of the elevation under consideration, and the tip has a shape of a spherical calotte and another part of the elevation under consideration has a conical shape The convex areas of the first surface make it possible to direct the light to the elevations in a controlled way and thus the optical properties of the optical device can be designed more freely than for example in cases where the first surface is smooth or has depressions corresponding to the elevations so that the material thickness between the first and second surfaces is substantially constant.

The optical device is advantageously a single piece of material. In this exemplifying case, there is no need for a mechanical support structure for mechanically supporting optical elements so that the positions of the optical elements with respect to each other are accurate enough.

An optical device according to the invention can be manufactured for example by mold casting. In accordance with the invention, there is provided also a new mold having a form suitable for manufacturing, by mold casting, an optical device according to the invention.

In accordance with the invention, there is provided also a new illuminator device comprising at least one light source and at least one optical device according to the invention. The at least one light source may comprise, for example, one or more light emitting diodes "LED".

A number of exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying embodiments when read in connection with the accompanying drawings.

The verbs "to comprise" and "to include" are used in this document as open limitations that neither exclude nor require the existence of also un-recited features.

The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE FIGURES

Exemplifying and non-limiting embodiments of the invention and their advantages are explained in greater detail below with reference to the accompanying drawings, in which.

DESCRIPTION OF EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

Figure 1A:
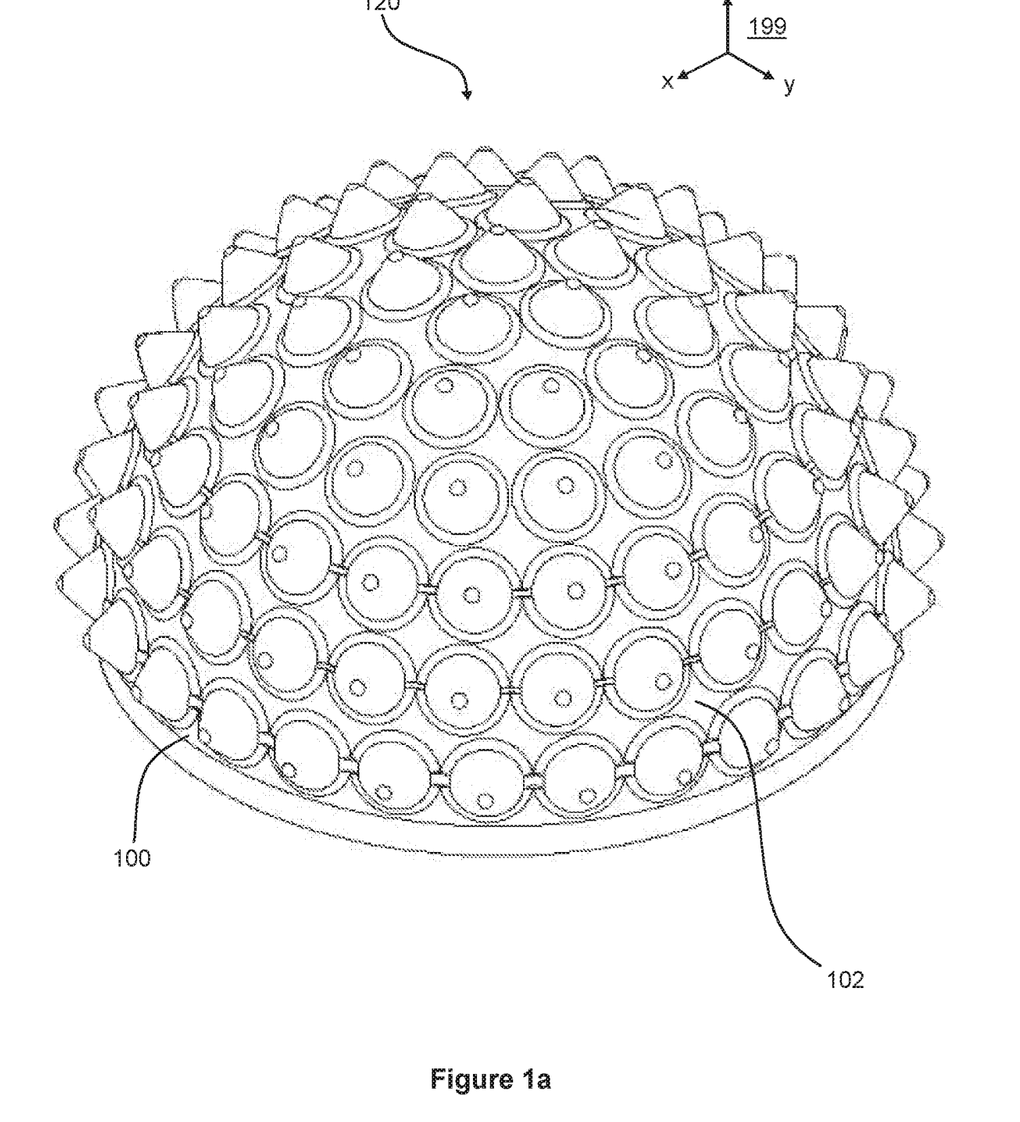
FIG. 1a shows an isometric view of an illuminator device comprising an optical device according to an exemplifying and non-limiting embodiment of the invention.
Figure 1B:
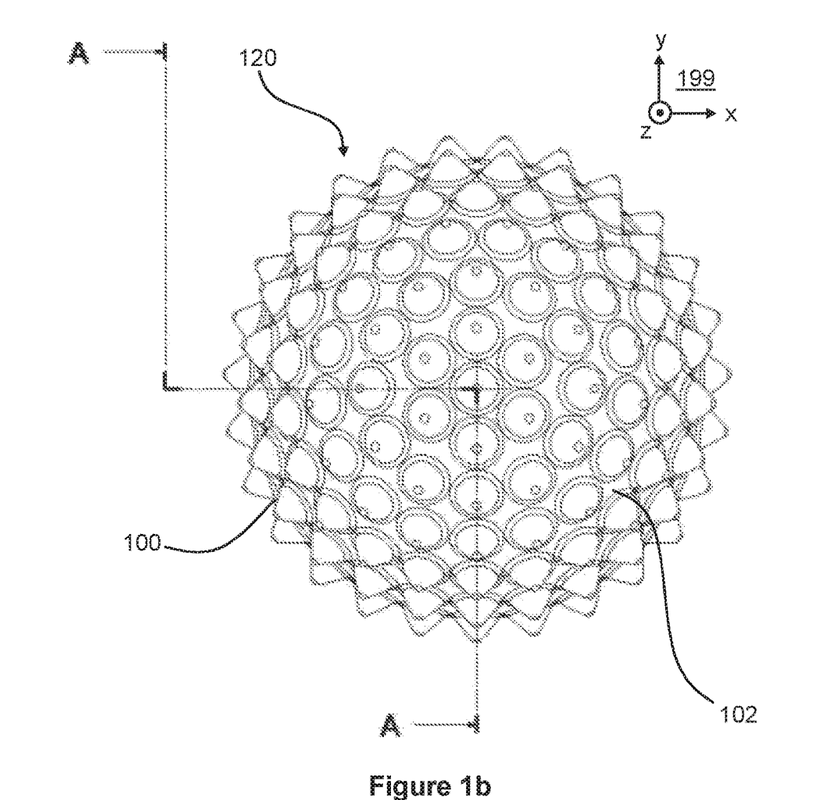
FIG. 1b shows a top view of the illuminator device.
Figure 1C:
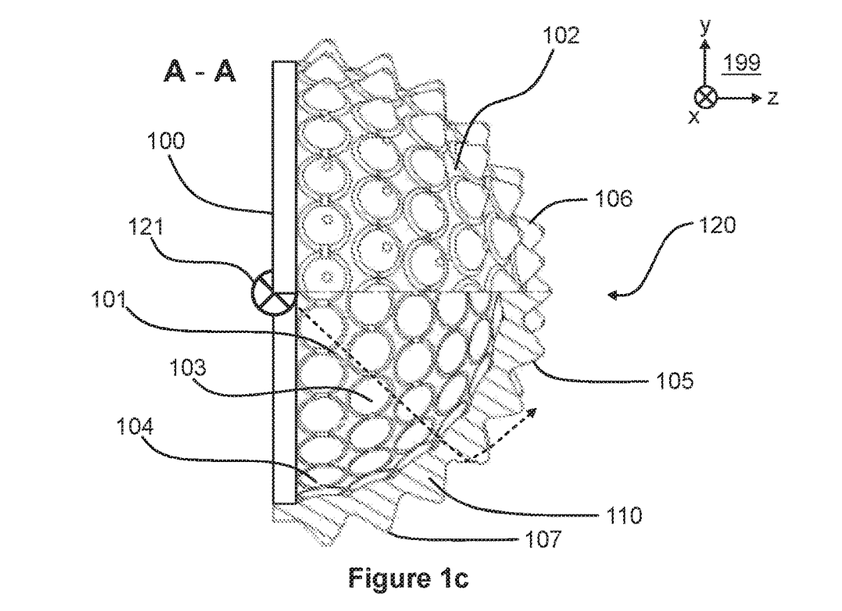
FIG. 1c shows a partial section view of the illuminator device.

FIG. 1a shows an isometric view of an illuminator device 120 that comprises an optical device 100 according to an exemplifying and non-limiting embodiment of the invention. FIG. 1b shows a top view of the illuminator device, and FIG. 1c shows a partial section view of the illuminator device. The section is taken along a fractional line A-A shown in FIG. 1b. The viewing directions related to FIGS. 1a-1c are illustrated with the aid of a coordinate system 199. The illuminator device 120 further comprises a light source 121 which is schematically illustrated in FIG. 1c. The light source may comprise, for example but not necessarily, one or more light emitting diodes "LED", one or more filament lamps, or one or more gas-discharge lamps. The optical device 100 can be made of transparent or translucent solid material whose refractive index is greater than one. The transparent or translucent material can be, for example, acrylic plastic, polycarbonate, optical silicone, or glass. The method of manufacture of the optical device 100 can be for example mold casting.

In the following, the optical device 100 is described in more details with reference to FIG. 1c. The optical device 100 comprises a first surface 101 for acting as a light-ingress surface for receiving light and a second surface 102 for acting as a light-egress surface. The first surface 101 comprises a plurality of convex areas and the second surface 102 comprises a plurality of elevations so that the convex areas are configured to direct the light to the elevations. In FIG. 1c, two of the convex areas are denoted with reference numbers 103 and 104 and two of the elevations are denoted with reference numbers 105 and 106. Each of the elevations is configured to turn at least a part of the light directed to the elevation under consideration substantially sideward with respect to the height direction of the elevation under consideration. In FIG. 1c, an exemplifying light beam is depicted with a dashed line provided with an arrow head. The dashed line representing the exemplifying light beam illustrates how one of the elevations turns the light beam substantially sideward with respect to the height direction of the elevation. In this exemplifying case, as illustrated with the dashed line, each elevation is shaped to provide total internal reflection "TIR" for at least a part of the light directed from the first surface 101 to the elevation under consideration and to refract at least a part the reflected light when the reflected light exits the optical device 100 via a part of the second surface 102 belonging to the elevation under consideration. It is worth noting that an optical device according to an embodiment of the invention may further comprise elevations which do not operate in the above-described way. For example, in addition to elevations of the kind described above where many light beams are first reflected and subsequently refracted, there can be also elevations where light beams are only refracted.

In the exemplifying optical device 100 illustrated in FIGS. 1a-1c, each of the elevations is tapering towards the tip of the elevation under consideration. In FIG. 1c, the tip of one of the elevations is denoted with a reference number 107. The tip of each elevation is shaped to allow the light directed from the first surface 101 to the tip to exit from the optical device via the tip. The shape of the tip is substantially the shape of a spherical calotte. In the exemplifying optical device 100 illustrated in FIGS. 1a-1c, each elevation is substantially conical and substantially rotationally symmetric.

The exemplifying optical device 100 illustrated in FIGS. 1a-1c is substantially a dome for modifying the light distribution of a substantially point-form light source such as the light source 121. The inner surface of the dome is the first surface 102 for receiving light from the light source 121 and the outer surface of the dome is the second surface acting as a light-egress surface. In this exemplifying case, the dome is substantially hemispherical. It is, however, also possible that an optical device according to an embodiment of the invention has some other curved shape so that the first surface is on an inner side of the curved shape and the second surface is on an outer side of the curved shape. An optical device according to an embodiment of the invention can be for example a straight or curved elongated trough for modifying the distribution of light emitted by a straight or curved elongated light source or by a straight or curved line of many point-form light sources. An elongated trough can be shaped to form for example a letter, a number, or another sign so that e.g. an illuminated advertisement can be constructed with the aid of optical devices according to suitable embodiments of the invention.

Figure 2:
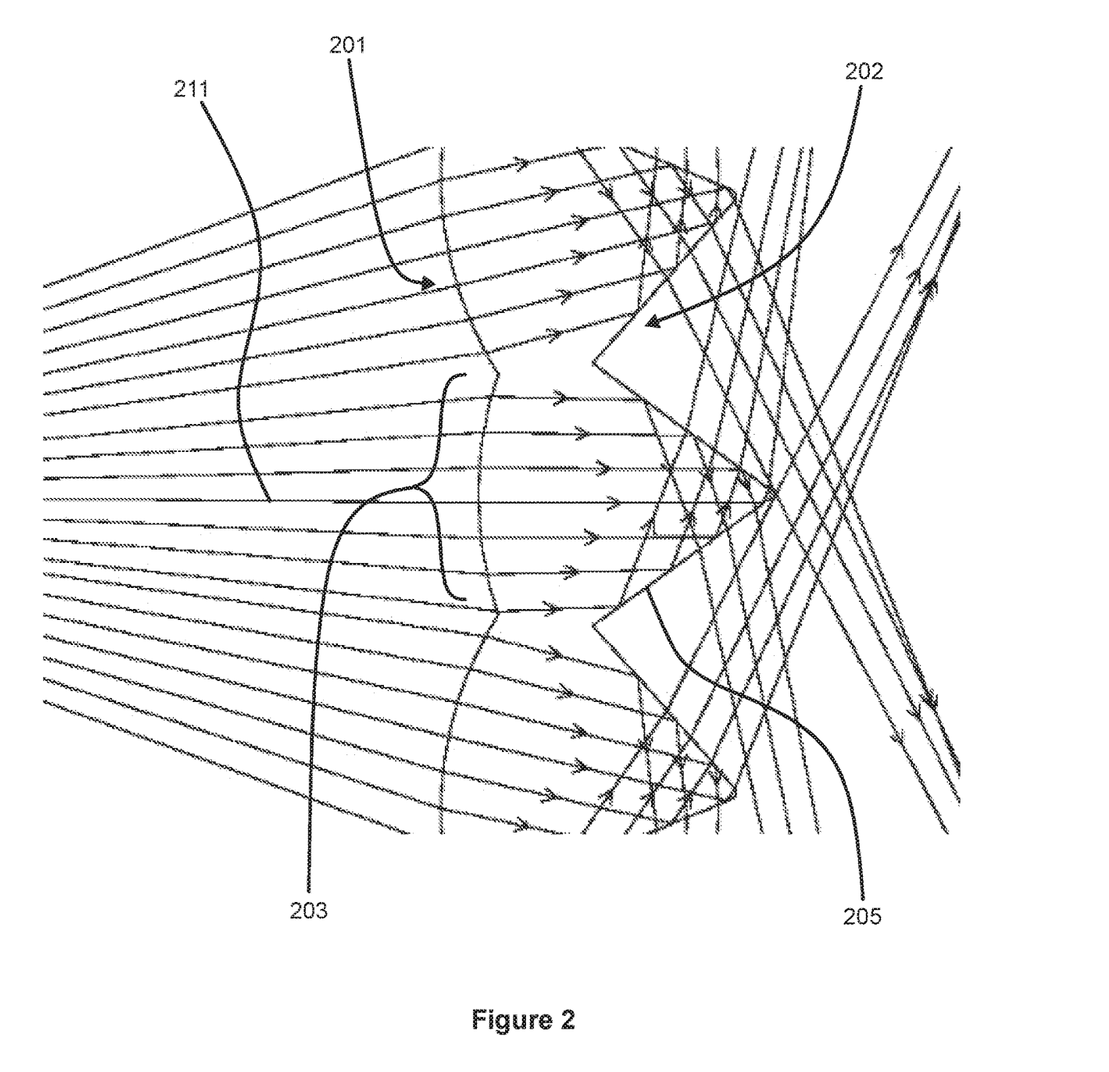
FIG. 2 illustrates a detail of an optical device according to an exemplifying and non-limiting embodiment of the invention.

FIG. 2 illustrates a detail of an optical device according to an exemplifying and non-limiting embodiment of the invention. FIG. 2 shows a section surface which corresponds to a section surface 110 shown in FIG. 1c. Diagonal hatching symbolizing a section surface has been omitted from FIG. 2 so as to keep the figure simple and clear. The optical device comprises a first surface 201 for acting as a light-ingress surface for receiving light and a second surface 202 for acting as a light-egress surface. The first surface 201 comprises a plurality of convex areas and the second surface 202 comprises a plurality of elevations so that the convex areas are configured to direct light to the elevations. In FIG. 2, one of the convex areas is denoted with a reference number 203 and one of the elevations is denoted with a reference number 205. In FIG. 2, exemplifying light beams are depicted with fractional lines provided with arrow heads.

In the exemplifying optical device illustrated in FIG. 2, each of the convex areas such as the convex area 203 is configured to direct light to one of the elevations and different ones of the convex areas are configured to direct light to different ones of the elevations. As shown in FIG. 2, the exemplifying light beams which exit the optical device via the second surface 202 are relatively well mixed to different directions.

Figure 3:
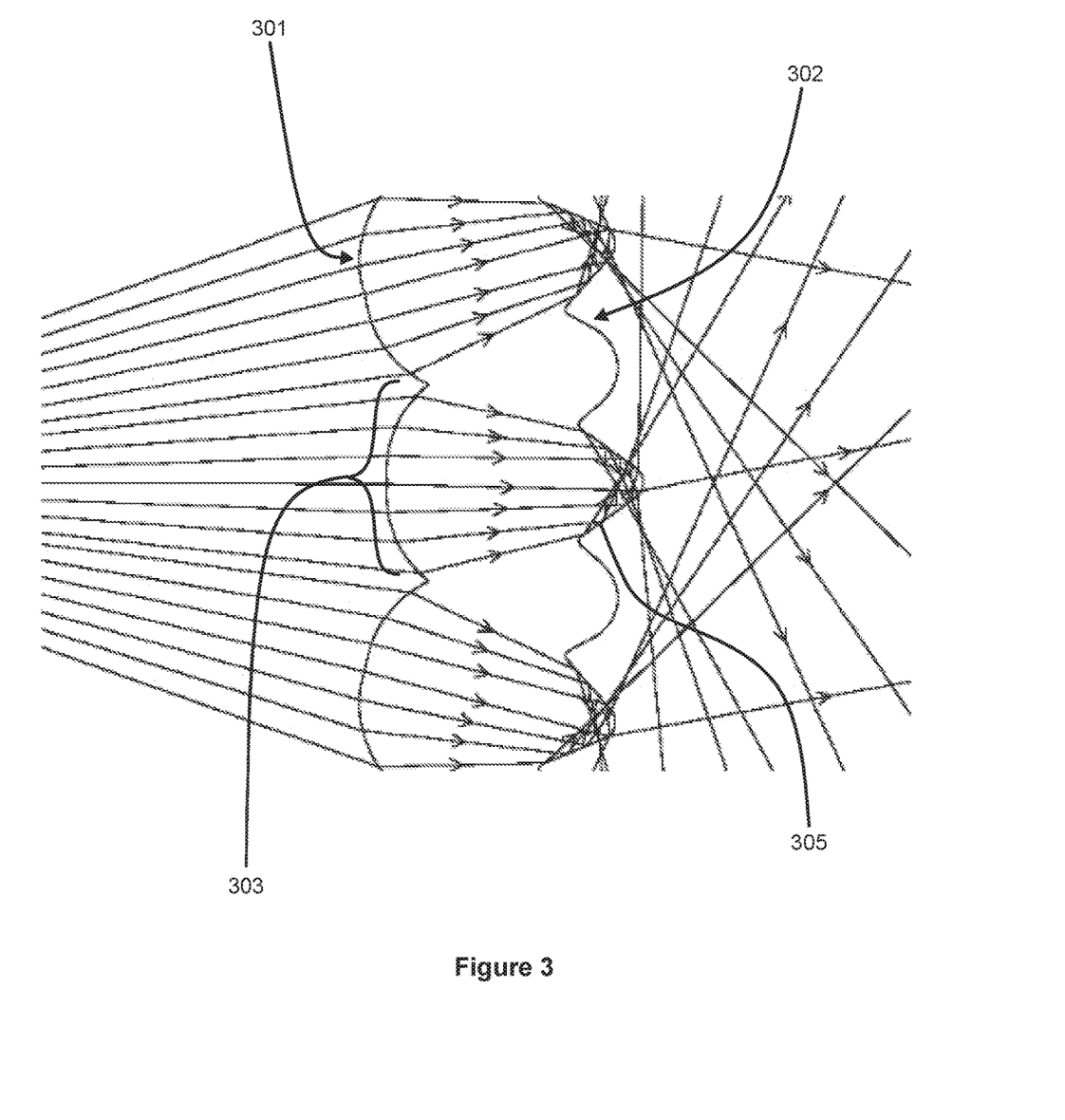
FIG. 3 illustrates a detail of an optical device according to an exemplifying and non-limiting embodiment of the invention.

FIG. 3 illustrates a detail of an optical device according to an exemplifying and non-limiting embodiment of the invention. FIG. 3 shows a section surface which corresponds to a section surface 110 shown in FIG. 1c. Diagonal hatching symbolizing a section surface has been omitted from FIG. 3 so as to keep the figure simple and clear. The optical device comprises a first surface 301 for acting as a light-ingress surface for receiving light and a second surface 302 for acting as a light-egress surface. The first surface 301 comprises a plurality of convex areas and the second surface 302 comprises a plurality of elevations so that the convex areas are configured to direct the light to the elevations. In FIG. 3, one of the convex areas are denoted with a reference number 303 and one of the elevations is denoted with a reference number 305. In FIG. 3, exemplifying light beams are depicted with fractional lines provided with arrow heads.

In the exemplifying optical device illustrated in FIG. 3, each of the convex areas such as the convex area 303 is configured to direct light to one of the elevations and different ones of the convex areas are configured to direct light to different ones of the elevations. As shown in FIG. 3, the exemplifying light beams which exit the optical device via the second surface 302 are well mixed to different directions.

Figure 4:
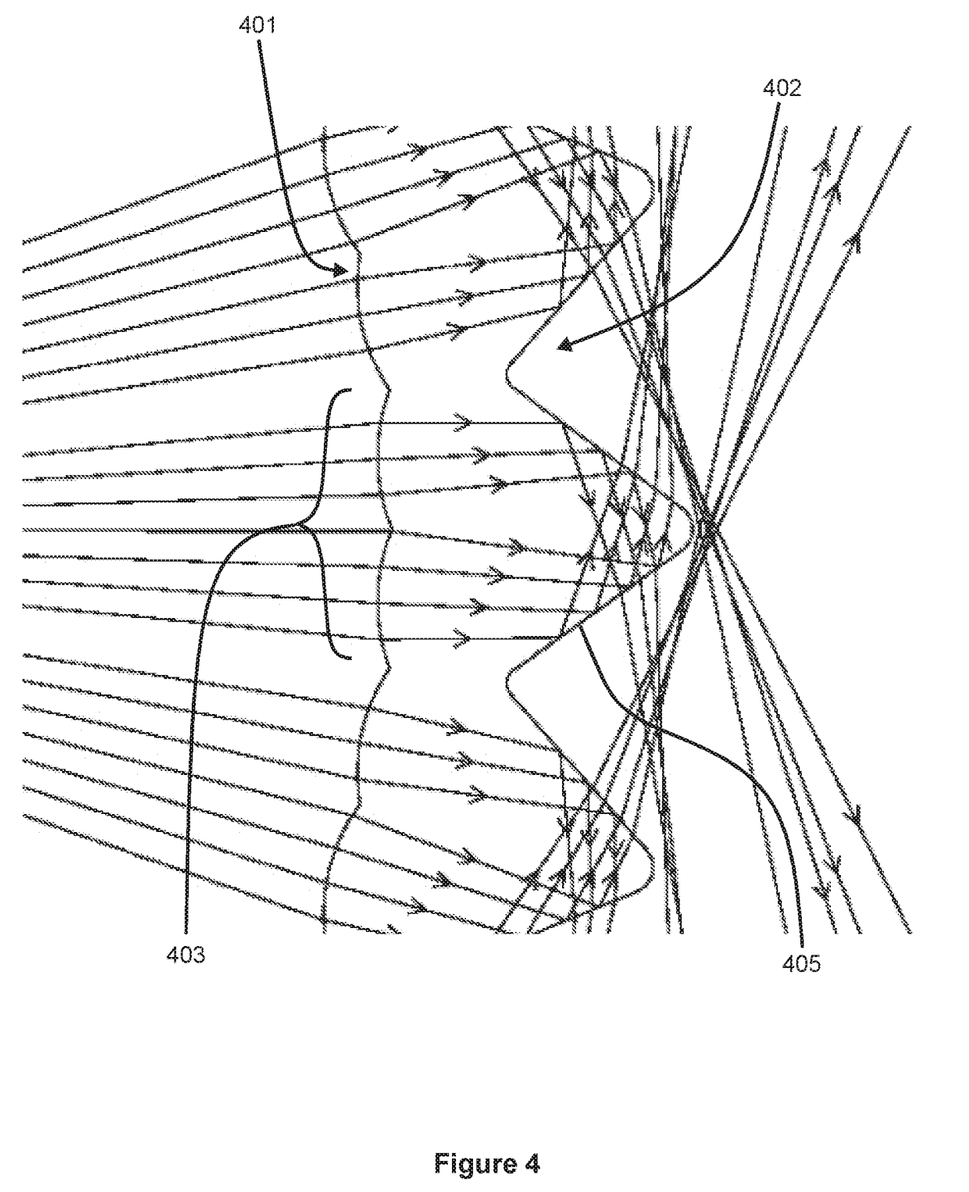
FIG. 4 illustrates a detail of an optical device according to an exemplifying and non-limiting embodiment of the invention.

FIG. 4 illustrates a detail of an optical device according to an exemplifying and non-limiting embodiment of the invention. FIG. 4 shows a section surface which corresponds to a section surface 110 shown in FIG. 1c. Diagonal hatching symbolizing a section surface has been omitted from FIG. 4 so as to keep the figure simple and clear. The optical device comprises a first surface 401 for acting as a light-ingress surface for receiving light and a second surface 402 for acting as a light-egress surface. The first surface 401 comprises a plurality of convex areas and the second surface 402 comprises a plurality of elevations so that the convex areas are configured to direct the light to the elevations. In FIG. 4, two of the convex areas are denoted with a reference number 403 and one of the elevations is denoted with a reference number 405. In FIG. 4, exemplifying light beams are depicted with fractional lines provided with arrow heads.

In the exemplifying optical device illustrated in FIG. 4, the convex areas of the first surface 401 constitute groups of mutually neighboring convex areas such as the convex areas 403 so that each of the groups of the mutually neighboring convex areas is configured to direct light to one of the elevations and different ones of the groups of the mutually neighboring convex areas are configured to direct light to different ones of the elevations. As shown in FIG. 4, the exemplifying light beams which exit the optical device via the second surface 402 are relatively well mixed to different directions.

As can be seen from FIGS. 2-4, there are many ways to tune the optical properties of optical devices according to different embodiments of the invention. For example, if the tips of the elevations shown in FIG. 2 were similar to the tips of the elevations shown in FIG. 4, the light beam denoted with a reference number 211 would exit the optical device without being reflected in the same way as shown in FIG. 2. For another example, as can be seen from FIG. 3, the convex areas of the first surface 301 are so strongly convex that the second surface 302 comprises areas to which no light, or only a very small portion of the light, is directed. For a third example, the convex areas of the first surface 401 shown in FIG. 4 are shaped so that substantially no light is directed to the tips of the elevations of the second surface 402. Therefore, the convex areas of the light-ingress surface make it possible to direct light to the elevations of the light-egress surface in a controlled way and thus the optical properties of the optical device can be designed more freely than for example in cases where the light-ingress surface is smooth or has depressions corresponding to the elevations so that the material thickness between the light-ingress and light-egress surfaces is substantially constant.

The specific examples provided in the description given above should not be construed as limiting the scope and/or the applicability of the appended claims. Lists and groups of examples provided in the description given above are not exhaustive unless otherwise explicitly stated.

What is claimed is:

1. An optical device for modifying light distribution, the optical device comprising:
   a first surface for acting as a light-ingress surface configured to receive light, said first surface having a plurality of convex areas; and
   a second surface for acting as a light-egress surface, said second surface having a plurality of elevations,
   wherein the convex areas are configured to direct light to at least some of the elevations, and each of the at least some of the elevations are configured to turn at least portions of the light directed to the respective elevation in sideward directions with respect to a height direction of the respective elevation so that the sideward directions comprise directions opposite to each other,
   wherein each of the at least some of the elevations are conical with a rounded tip, and
   wherein the convex areas are aligned with the elevations so that a spatial distribution of a thickness between the first and second surfaces is the same over one or more of each of the elevations and each of the convex areas.

2. The optical device according to claim 1, wherein each of the at least some of the elevations are shaped to provide total internal reflection for at least a portion of the light directed from the first surface to the elevation and to refract at least a portion of the reflected light when the reflected light exits the optical device via a portion of the second surface belonging to the elevation.

3. The optical device according to claim 1, wherein each of the convex areas are configured to direct light to one of the elevations, and wherein different convex areas are configured to direct light to different elevations.

4. The optical device according to claim 1, wherein the convex areas constitute groups of mutually neighboring convex areas so that each of the groups of the mutually neighboring convex areas is configured to direct light to one of the elevations and different neighboring convex areas of the groups are configured to direct light to different elevations.

5. The optical device according to claim 1, wherein each of the at least some of the elevations are rotationally symmetric.

6. The optical device according to claim 1, wherein the optical device has a curved shape so that the first surface is on an inner side of the curved shape and the second surface is on an outer side of the curved shape.

7. The optical device according to claim 1, wherein each of the conical elevations tapers smoothly towards the rounded tip of the respective elevation.

8. The optical device according to claim 2, wherein each of the convex areas are configured to direct light to one of the elevations and different convex areas are configured to direct light to different elevations.

9. The optical device according to claim 2, wherein the convex areas constitute groups of mutually neighboring convex areas so that each of the groups of the mutually neighboring convex areas are configured to direct light to one of the elevations and different neighboring convex areas are configured to direct light to different elevations.

10. The optical device according to claim 2, wherein each of the at least some of the elevations are rotationally symmetric.

11. The optical device according to claim 2, wherein the optical device has a curved shape so that the first surface is on an inner side of the curved shape and the second surface is on an outer side of the curved shape.

12. The optical device according to claim 3, wherein each of the at least some of the elevations are rotationally symmetric.

13. The optical device according to claim 3, wherein the optical device has a curved shape so that the first surface is on an inner side of the curved shape and the second surface is on an outer side of the curved shape.

14. The optical device according to claim 4, wherein each of the at least some of the elevations are rotationally symmetric.

15. The optical device according to claim 4, wherein the optical device has a curved shape so that the first surface is on an inner side of the curved shape and the second surface is on an outer side of the curved shape.

16. The optical device according to claim 5, wherein the optical device has a curved shape so that the first surface is on an inner side of the curved shape and the second surface is on an outer side of the curved shape.

17. The optical device according to claim 6, wherein the optical device is a dome for modifying a light distribution of a point-form light source, an inner surface of the dome being the first surface and an outer surface of the dome being the second surface.

18. A mold comprising:
a form suitable for manufacturing, by mold casting, an optical device for modifying light distribution, the optical device having:
a first surface for acting as a light-ingress surface configured to receive light, said first surface having a plurality of convex areas, and
a second surface for acting as a light-egress surface, said second surface having a plurality of elevations,
wherein the convex areas are configured to direct light to at least some of the elevations, and each of the at least some of the elevations are configured to turn at least portions of the light directed to the respective elevation in sideward directions with respect to a height direction of the respective elevation so that the sideward directions comprise directions opposite to each other,
wherein each of the at least some of the elevations are conical with a rounded tip, and
wherein the convex areas are aligned with the elevations so that a spatial distribution of a thickness between the first and second surfaces is the same over one or more of each of the elevations and each of the convex areas.

19. An illuminator device comprising:
at least one light source: and
at least one optical device for modifying light distribution, the at least one optical device having:
a first surface for acting as a light-ingress surface configured to receive light, said first surface having a plurality of convex areas,
a second surface for acting as a light-egress surface, said second surface having a plurality of elevations,
wherein the convex areas are configured to direct light to at least some of the elevations, and each of the at least some of the elevations are configured to turn at least portions of the light directed to the respective elevation in sideward directions with respect to a height direction of the respective elevation so that the sideward directions comprise directions opposite to each other,
wherein each of the at least some of the elevations are conical with a rounded tip, and
wherein the convex areas are aligned with the elevations so that a spatial distribution of a thickness between the first and second surfaces is the same over one or more of each of the elevations and each of the convex areas.

* * * * *